United States Patent [19]

Sagues et al.

[11] Patent Number: 5,410,373
[45] Date of Patent: Apr. 25, 1995

[54] CHASSIS ASSEMBLY WITH MEANS FOR MOUNTING WITHIN THIN WALL OPENING

[75] Inventors: Paul Sagues; Steven M. Kraft, both of Berkeley, Calif.

[73] Assignee: Berkeley Process Control, Richmond, Calif.

[21] Appl. No.: 115,541

[22] Filed: Sep. 2, 1993

[51] Int. Cl.⁶ .......................................... H04N 5/645
[52] U.S. Cl. ................... 348/825; 348/836; 248/27.1; 361/682; 312/242
[58] Field of Search ............ 348/825, 836, 843; 312/7.2, 242; 52/27, 28, 208, 171.1; 248/27.1; 361/682

[56] References Cited

U.S. PATENT DOCUMENTS

| | | | |
|---|---|---|---|
| 4,002,831 | 1/1977 | Aeschliman | 348/436 |
| 4,139,972 | 2/1979 | Naka | 52/208 |
| 4,487,449 | 12/1984 | Igel et al. | 52/208 |
| 4,566,233 | 1/1986 | Naka | 52/208 |
| 4,754,586 | 7/1988 | Fujikawa | 52/208 |
| 4,843,789 | 7/1989 | Naka | 52/208 |
| 4,853,790 | 8/1989 | Dickie | 348/836 |
| 5,084,757 | 1/1992 | Leo et al. | 348/825 |
| 5,271,581 | 12/1993 | Irish | 52/208 |

Primary Examiner—Scott A. Rogers
Assistant Examiner—Thomas L. Stoll
Attorney, Agent, or Firm—Owen, Wickersham & Erickson

[57] ABSTRACT

An electronic chassis is disclosed for supporting components such as a CRT device or flat panel display unit and adapted for installation through an opening in a cabinet without requiring access from within the cabinet to secure the chassis in place. The frontal end of the chassis has flange members on opposite sides which fit against the cabinet surface around its opening. One side of the chassis frontal end has a movable retainer means controlled by one or more drive screws that can be adjusted to grip one side of the cabinet opening. Continued actuation of the drive screws moves the chassis into locking contact with a fixed retainer means on the opposite side of the chassis. A bezel frame member attached to the frontal end of the chassis covers the drive screws but has access holes to facilitate their adjustment, and gaskets are provided on the bezel frame to prevent moisture from entering the chassis or the cabinet opening.

15 Claims, 5 Drawing Sheets

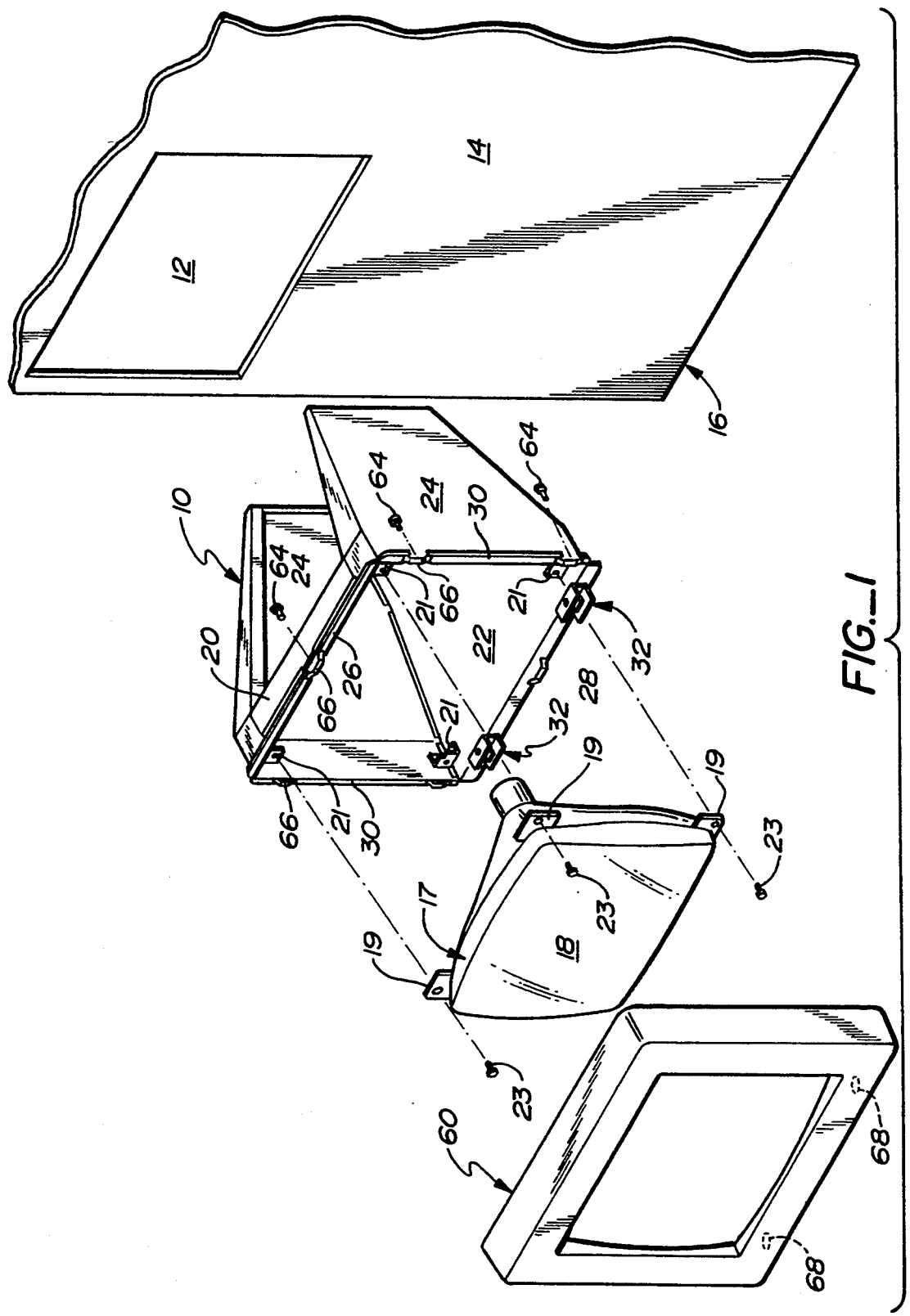
FIG._1

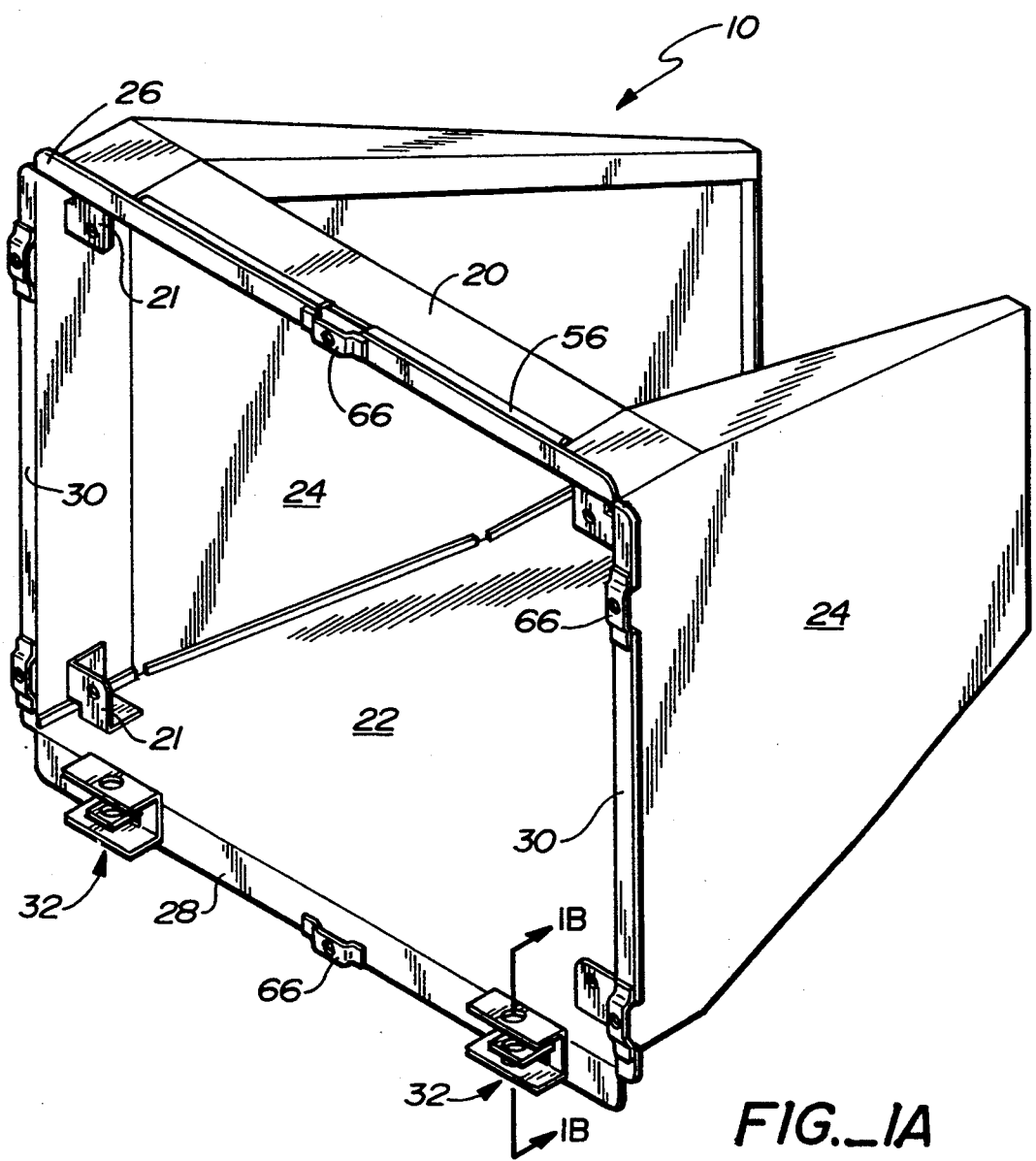
FIG._1A
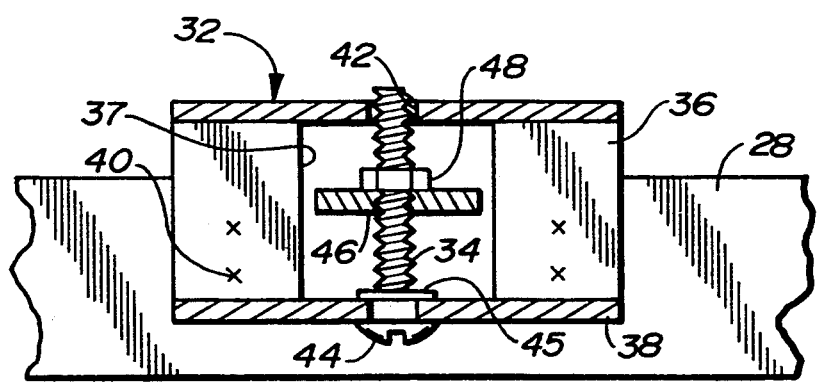
FIG._1B

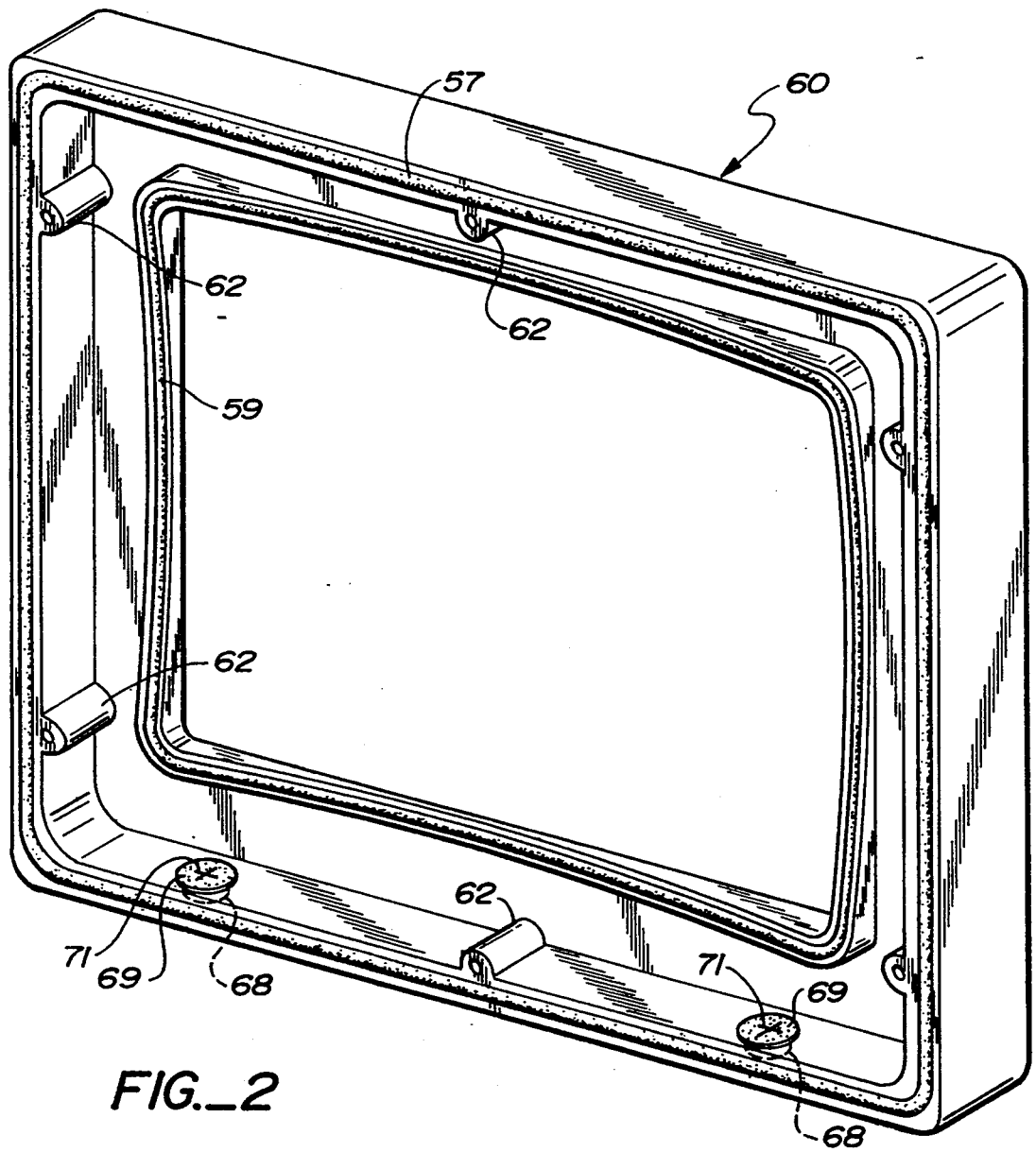
FIG._2

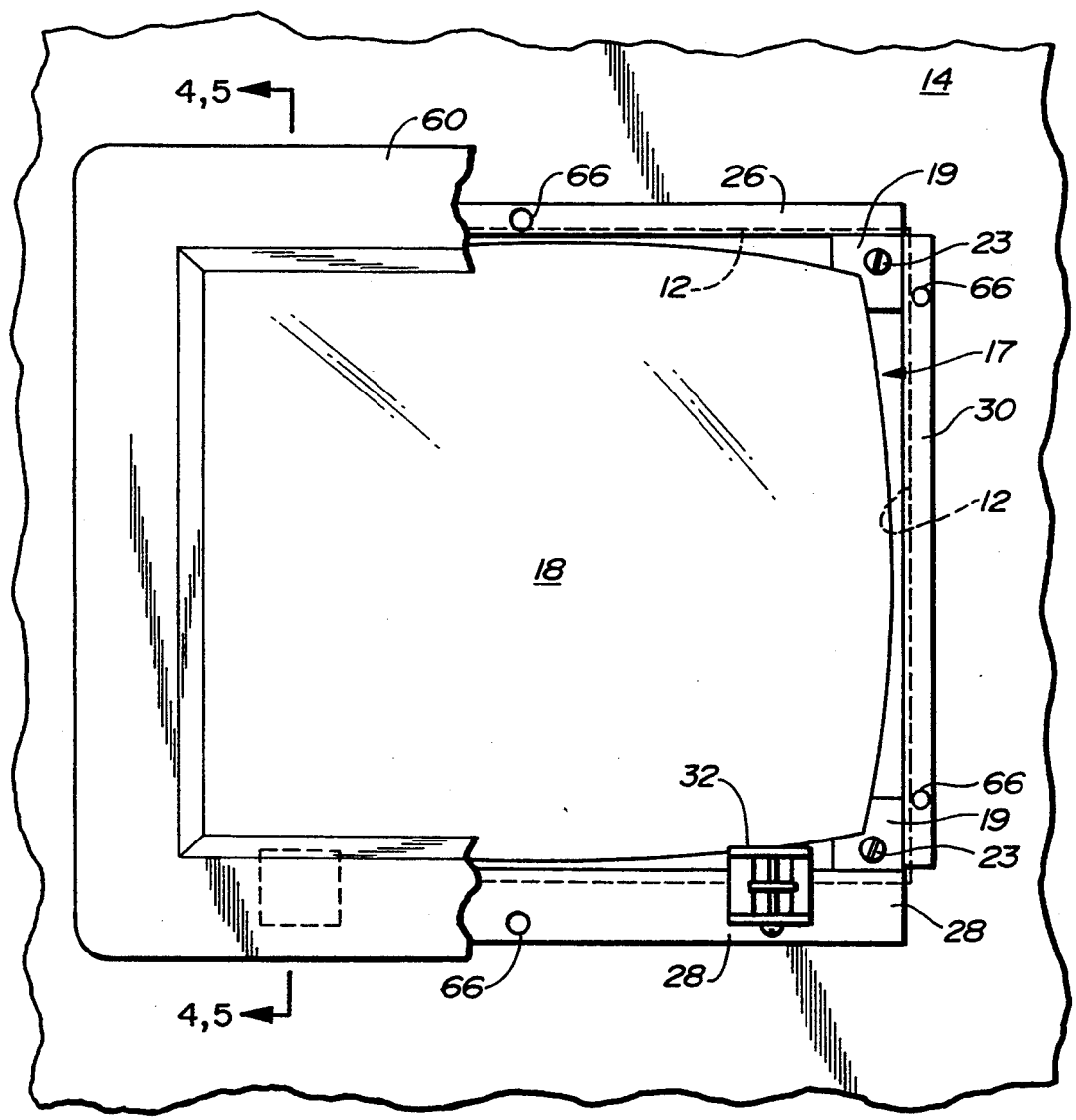
FIG._3

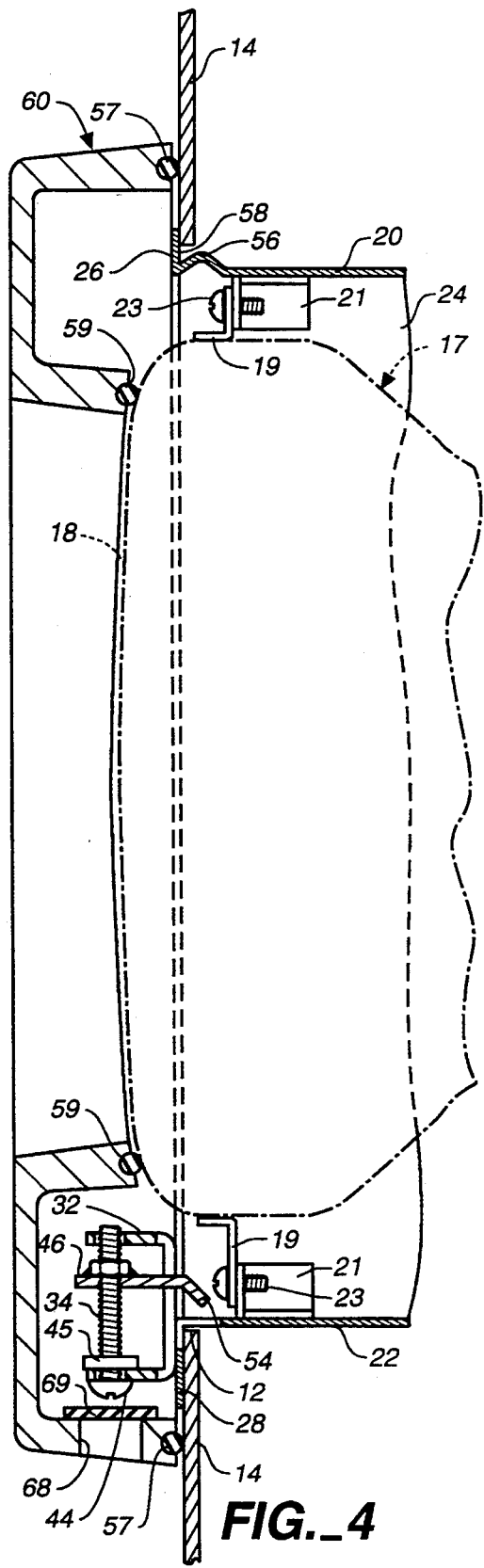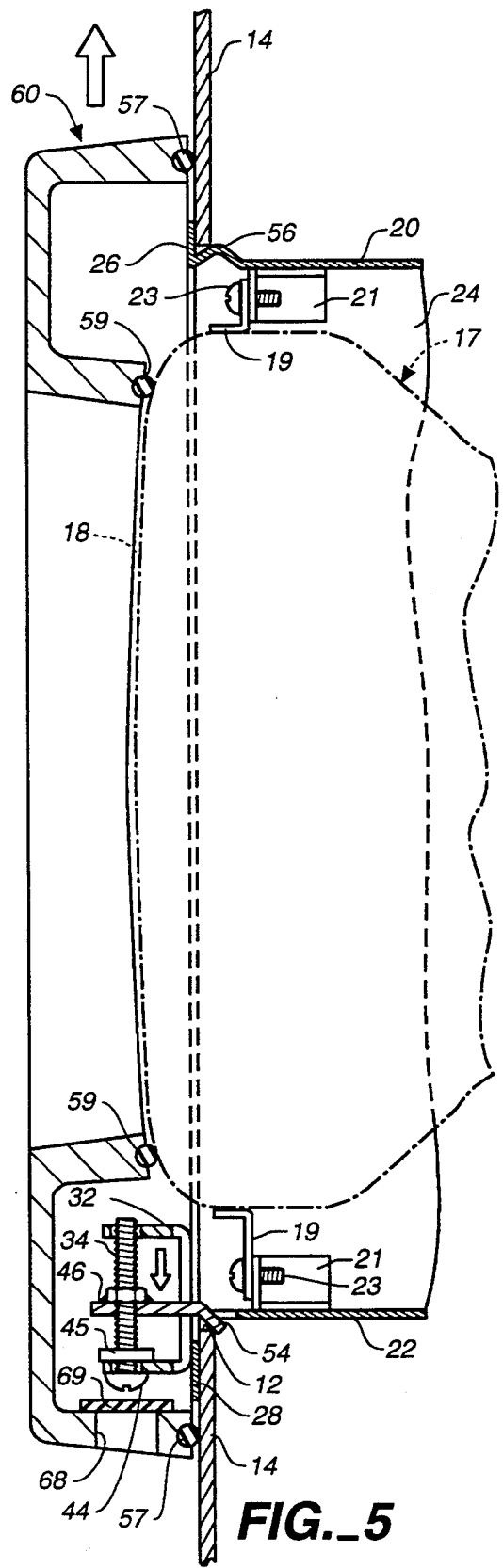
FIG._4    FIG._5

CHASSIS ASSEMBLY WITH MEANS FOR MOUNTING WITHIN THIN WALL OPENING

This invention relates to a structural assembly such as a chassis for supporting electronic components, and more particularly it relates to means on the chassis for mounting it in an opening of a relatively thin wall or panel member of a cabinet.

BACKGROUND OF THE INVENTION

In the construction of various types of testing or control equipment, it often becomes necessary to mount certain electronic components having visible screens within confined areas of an equipment cabinet or housing. For example, testing components comprising a chassis containing a CRT tube and operating circuitry with a frontal screen are preferably mounted within an opening in a relatively thin wall of the equipment housing. Often, the opening is most conveniently located within a movable door of an equipment cabinet which provides access to other components contained therein.

Heretofore, such electronic components with their attached screens were mounted by means of relatively complicated bracket supports which were attached to the inside wall surfaces of the equipment cabinet. One serious disadvantage with such prior art mounting arrangements was that they were accessible and installable only from the interior side of the mounting wall. Also, they were generally complicated and required relatively tedious procedures and a significant amount of time, and often special tools, to install. Another equally important disadvantage was that the various prior interior mounting bracket arrangements required a significant amount of clearance space to facilitate their installation, thereby requiring a larger and more expensive equipment housing or cabinet.

It is therefore one object of the present invention to provide an improved mounting system for an electronic component chassis that supports a CRT or flat panel display device having a frontal screen which enables the chassis to be installed within an opening of a relatively thin cabinet wall without requiring any access to the interior of the cabinet.

Another object of the invention is to provide an electronic chassis for installation in a cabinet that can be mounted quickly from the front of the cabinet without special tools using relatively unskilled labor.

Still another object of the invention is to provide a mounting system for a cathode ray tube (CRT) or flat panel display device in a cabinet that assures a reliable, moisture proof seal around the device within the cabinet opening.

Yet another object of the invention is to provide an easily mountable chassis for supporting a CRT or flat panel display device in a cabinet that is particularly well adapted for ease and economy of manufacture.

SUMMARY OF THE INVENTION

In accordance with principles of the present invention, a typical electronic chassis for supporting a CRT or flat panel display device and its operating circuit is provided within a suitable oblong shaped enclosure assembly so that a frontal screen of the CRT or flat panel display device is surrounded by peripheral flange members. The basic cross-sectional dimensions of the enclosure assembly are slightly less than those of an opening that is provided in a relative thin wall or door of a typical storage housing or cabinet for electronic device. Thus, when the chassis is installed, no access from the inside of the cabinet is required. The CRT chassis is merely placed through the opening so that it extends into the cabinet with its attached flange members engaging the outer surface of the thin wall around the opening. Attached to the flange members is an outer frame or bezel member that extends around the cabinet opening. Within a lower horizontal portion of the bezel member are access recesses for two or more tension screws, each of which is supported by a bracket fixed to a lower flange of the chassis. Each screw also extends through and is adapted to move an adjustable retainer member that extends generally horizontally through the opening and has an angled end portion. As each screw is turned, its attached arm is moved downwardly until it bears against the bottom edge of the wall opening, with its angled end portion serving to keep the arm engaged therewith. As the screws are continually rotated, the retainer arms bear against the opening bottom edge and the CRT chassis is raised until its top surface engages an upper horizontal edge of the opening. A fixed retainer projection is provided on the upper surface of the CRT chassis and is spaced from an upper flange to provide a groove that retains the upper edge of the thin wall opening across the upper end of the chassis. Once the screws have been fully tightened, the CRT chassis is held in place by the adjustable and fixed retainer members and thus is firmly installed without the necessity to gain access to the inside of the cabinet. Also, only a minimum amount of space is required for its installation. The bezel frame unit is provided with gasket members which seal the opening around the CRT device so that no moisture can get into the cabinet interior.

Other objects, advantages and features of the invention will become apparent from the following detailed description of one embodiment thereof presented in conjunction with the accompanying drawing.

BRIEF DESCRIPTION OF THE DRAWING

FIG. 1 is an exploded view in perspective showing an electronic chassis assembly according to the invention as it appears when being installed within a typical cabinet.

FIG. 1A is an enlarged view in perspective of the chassis for the assembly shown in FIG. 1.

FIG. 1B is an enlarged fragmentary view of one bracket assembly taken along line 1B—1B of FIG. 1A.

FIG. 2 is an enlarged rear view in perspective of the bezel frame unit of FIG. 1.

FIG. 3 is a front view in elevation of an installed electronic chassis assembly embodying principles of the invention, with portions broken away to show the front of the chassis.

FIG. 4 is a fragmentary view in side elevation and in section taken along the line 4—4 of FIG. 2 showing the chassis within a cabinet opening before the drive screws have been rotated to their full mounting position.

FIG. 5 is a fragmentary view in side elevation and in section similar to FIG. 4, taken along the line 5—5 of FIG. 2 and showing the chassis fully mounted and secured within the cabinet opening.

DETAILED DESCRIPTION OF EMBODIMENT

With reference to the drawing, FIG. 1 shows an electronic chassis 10 as it appears when being installed through an opening 12 in the front wall 14 a cabinet 16. In a typical installation where the present invention is most applicable, the chassis 10 supports a cathode ray tube (CRT) unit 17 having a glass screen 18 at one end which, when the chassis is fully installed, is required to substantially fill and be flush with the opening 12. Adapted to attach to the chassis 10 and to surround the opening 12, is a bezel frame unit 60. In accordance with the invention, access to the cabinet interior is not required in order to install and secure the chassis 10 to the cabinet. Although the invention is shown for accommodating a CRT device, it is equally applicable for use with a flat panel display unit having a screen which is also supported by the chassis 10.

The chassis 10 has generally an oblong shape which is constructed to house the CRT tube 17 or a flat panel display unit and associated elements and circuitry (not shown). Generally, the chassis is an assembly comprised of interconnected sheet metal components including a top member 20, a bottom member 22 and interconnecting side wall members 24 all of which are held together by suitable fasteners and/or spot weldments. The distance between the top and bottom member is less than that of the vertical dimension of the cabinet opening 12. Similarly, the distance between the side wall members 24 is less than that of the horizontal dimension of the cabinet opening. Thus, with respect to the opening 12, there is ample clearance around the chassis 10 so that it can be moved easily through the opening 12 into the cabinet 16 from outside the cabinet.

Across the front of the chassis 10, as shown more clearly in FIG. 1A is an upper flange 26 that is integral with and extends upwardly along the outer edge of the top member 20. Similarly, a lower flange 28 is provided along the outer edge of the bottom member that extends downwardly therefrom. As shown in FIG. 2, the widths of both flanges 26 and 28 are such that the distance between their outer edges substantially exceeds the vertical distance of the opening 12.

Similar side flanges 30 are provided along the edges of each of the side wall members 24 which extend outwardly therefrom at substantially 90°. Again, the overall distance between the outer edges of the side flanges is substantially greater than the horizontal dimension of the cabinet opening.

Also, as shown in FIG. 1A, a pair of spaced apart brackets 32 are fixed to the outer surface of the lower flange 28 and each supports a rotatable drive screw 34. Each bracket 32 has a channel shaped cross-section, as seen in FIG. 1B, with a pair of spaced apart web portions 36 forming a web opening 37 and integral with a pair of parallel, spaced apart horizontal leg portions 38 interconnected by the web portions 36. The web portions 36 are attached to the lower flange 28 of the chassis at spaced apart locations by suitable fasteners or spotwelds 40. The leg portions 38 of each bracket are provided with a pair of vertically aligned holes 42 to accommodate the shaft of a drive screw 34. As best seen in FIG. 1B, each drive screw 34 has a head 44 which extends below a lowermost leg portion 38 of the bracket 32 and has either a slot or a flat sided recess adapted to receive an appropriately shaped screwdriver. The drive screw 34 extends through the lower leg portion 38 of the bracket 32 and through a snap ring 45 on the inner side of the lower leg which retains the head 44 of the drive screw against the under or outer side of the lower leg portion 38. Thus, the drive screw extends through the hole 42 in the lower leg portion 38 and the aligned hole in the upper leg portion, the latter serving as a guide means to retain the drive screw as it is rotated axially. Between the upper and lower leg portions 38 of the bracket and threadedly engaged by the shaft of a drive screw 34 is a rigid but movable lower retainer member 46. This retainer member 46 preferably has an enlarged nut or hub portion 48 at one end having an internally threaded bore for the drive screw. Extending from the hub portion 48 at 90° to the axis of the drive screw is a tongue portion having an outer end 54 that is bent downwardly at an angle of around 30°. Each movable retainer member 46 extends through the opening 37 of the bracket web portion, and the length of the tongue portion is such that its bent outer end portion 54 extends inside and across the lower edge of the cabinet wall opening 12, as shown in FIGS. 4 and 5.

Near the outer edge of the chassis top cover member 20 is an upper fixed retainer means. In the embodiment shown, this upper retainer means is in the form of a transverse ridge member 56 in the top cover member which is parallel to and spaced inwardly from the upper flange 26, thereby forming an elongated groove 58 between the flange 26 and the ridge member 56.

The CRT device 17 is attached to the chassis before installation in the cabinet 16 by any suitable means. For example, as shown in FIG. 1, the CRT device may be provided with four attaching ears 19 that project outwardly from corners of the frontal portion of the device. Each ear has a hole which is aligned with a similar hole in each of four fixed mounting brackets 21 near the front of the chassis. Suitable fasteners 23 are provided through the aligned holes in the ears and brackets to secure the CRT device 17 to the chassis 16.

After the CRT or flat panel display package is installed within the chassis 10, the bezel frame unit 60 is attached to the chassis before the entire assembly is installed within a cabinet in accordance with the principles of the invention. The bezel frame unit 60 may be made of a suitable cast plastic, metal or ceramic material having a cosmetically appealing outer configuration. As shown in FIG. 2, it has an irregular contour on its rear side which surrounds the cabinet opening 12. One important function of the bezel unit is to provide a moisture seal for the CRT unit that is held by the chassis. Thus, on the rear side of the bezel unit are a pair of inner and outer generally rectangular, endless gaskets 57 and 59. As shown in a cross-sectional view of the bezel unit in FIG. 4 the outer gasket 59 is retained within a groove formed on the rear side of the bezel unit and is located so that it bears against the outer surface of the cabinet front wall 14 that surrounds the opening, thereby forming a moisture seal. The inner gasket 59, spaced inwardly from the outer gasket is also retained within a groove of the bezel unit and it is positioned so that it bears against an outer peripheral area of the CRT tube 18, thereby forming a further moisture barrier. On its inner side, as shown in FIG. 2, in the space between the two gaskets, the bezel is provided with spaced apart bosses 62 having threaded sockets for receiving attaching screws 64 that extend through similarly located holes 66 in the flanges 26, 28 and 30 of the chassis 10. (See FIG. 1)

With the bezel frame 60 attached to the chassis assembly 10 by means of the attaching screws 64, the entire unit is ready for a relatively simple installation in the cabinet wall. As shown in FIG. 4, the assembled unit is placed through the cabinet wall opening 12 until the flanges 26, 28 and 30 are all in flush contact with the outer surface of the cabinet wall 14 around the opening 12. At this point, the drive screws 34 and lower retainer members 46 are substantially in the position shown in FIG. 4, and the heads 44 of the drive screws are accessible through openings 68 formed in the bottom portion of the bezel. To further protect the bezel 60 from outside moisture, each opening is normally closed by a flexible cover member 69 which can be displaced by a tool for turning the drive screws 34. As shown in FIG. 2, each cover member 69 comprises a circular piece of flexible rubber or plastic material which is bonded at its periphery to the inner circular edge of an access opening 68. Each member 69 has a cruciform slit 71 across its inner area covering the opening so that a screwdriver can be easily pushed through the cover member to contact the head of a drive screw. Once the chassis 10 is installed with the drive screws fully tightened, the cover members 69 effectively prevent any moisture from passing through the openings 68. Now, using an appropriate screwdriver, each drive screw is turned until its retainer member 46 moves downwardly and its outer end 54 contacts the lower edge of the cabinet opening 12, as shown in FIG. 5. As each screw is turned further, with its retainer member 46 bearing against the opening edge, the entire chassis 10 is moved upwardly until the upper edge of the opening 12 moves into the elongated groove 58 between the flange 26 and the upper retainer member 56. When both drive screws 34 are fully tightened, the chassis 10 is firmly held by the upper and lower retainer members 46 and 56 and thus is secured to the cabinet wall within the opening.

In the embodiment shown, the brackets 32 and thus the drive screws 34 and the lower active retainer members 46 are located on the bottom side of the chassis 10, while the upper or passive retainer member 56 is on the opposite side of the chassis. Although perhaps not as cosmetically desirable, it is apparent that an active retainer member or members could be on some other side (e.g. the top or one side) of the chassis with a passive retainer member on its opposite side. Also, depending on the size of the chassis it may be desirable to use only one or more than two brackets with accompanying drive screws and active retainer members.

To those skilled in the art to which this invention relates, many such changes in construction and widely differing embodiments and applications of the invention will make themselves known without departing from the spirit and scope of the invention. The disclosure and the description herein are purely illustrative and are not intended to be in any sense limiting.

What is claimed is:

1. An electronic chassis adapted for mounting within an opening having an upper edge, a lower edge and side edges in a cabinet wall or door of sheet material so that the chassis extends within the cabinet while one end thereof having a screen is visible within the opening, said chassis comprising:
    a transverse top member and a bottom member;
    upper flange means extending upwardly from said top member;
    lower flange means extending downwardly from said bottom member, said upper and lower flange means being adapted to overlap the outside surface of said cabinet wall above and below said opening when said chassis is placed through said opening;
    a plurality of brackets fixed to said lower flange means;
    a drive screw rotatably supported in each said bracket;
    a movable lower retainer member threadedly engaged with each said drive screw and extending inwardly transverse to the lower edge of said cabinet opening; and
    an upper retainer means on said top member spaced from said upper flange means and forming a seat for the upper edge of said opening;
    whereby rotation of said drive screws after placement of said chassis within said opening causes said lower retainer members to move downwardly to engage said lower edges of said opening, and continued rotation of said screws causes said chassis to move upwardly until said upper edge of said opening is firmly located within said seat between said upper flange and said upper retainer means.

2. The electronic chassis described in claim 1 including;
    a bezel frame;
    means for securing said bezel frame to said upper and lower flange means of said chassis; and
    openings in one side of said bezel frame for providing access to said drive screws during installation of said chassis in a cabinet wall.

3. The electronic chassis described in claim 2 including movable cover members extending over said access openings for preventing moisture from entering the interior of said bezel frame.

4. The electronic chassis described in claim 2 including a pair of continuous gasket members retained on the rear side of said bezel frame for forming a moisture proof seal around said chassis after it is installed in said cabinet opening.

5. The electronic chassis described in claim 1 wherein two said brackets are attached at spaced apart locations to said lower flange means or said chassis.

6. The electronic chassis described in claim 1 wherein each said bracket has a channel shaped cross-section with leg portions interconnected by a pair of spaced apart web portions, said leg portions having aligned holes for supporting a said drive screw.

7. The electronic chassis described in claim 1 wherein each said lower retainer means comprises a relatively narrow but rigid tongue member which extends perpendicular to the axis of its drive screw through said web opening and across the lower edge of the cabinet opening, and a relatively thick portion at one end of said plate for threadedly engaging a drive screw.

8. The electronic chassis described in claim 1 wherein said upper retainer means comprises an elongated ridge member spaced from and generally parallel to said upper flange means.

9. The electronic chassis described in claim 7 including a bent down tip portion at the end of each said tongue member.

10. The electronic chassis described in claim 2 wherein said means for securing said bezel frame to said chassis comprises a plurality of threaded bosses within said frame, a series of holes in said chassis flange means and threaded fasteners extending through said holes into said boss members.

11. An electronic chassis adapted for mounting within an opening having upper and lower horizontal edges and side edges in a cabinet wall of sheet material so that the chassis extends within the cabinet while one end thereof having a screen is visible within the opening, said chassis comprising:
    a transverse top member and a bottom member;

a first flange means and a second flange means extending upwardly from said members and adapted to overlap the outside surface of said cabinet wall above and below said opening when said chassis is placed through said opening;

bracket means fixed to one of said flange means;

drive screw means rotatably supported by said bracket means;

a first retainer member threadedly engaged with said drive screw means and extending inwardly transverse to one horizontal edge of said cabinet opening; and a second retainer means spaced from the other said flange means and forming a seat for the other horizontal edge of said opening;

whereby rotation of said drive screw means after placement of said chassis within said opening causes said first retainer member to move to and engage one said horizontal edge of said opening, and continued rotation of said screw means causes said chassis to move within said opening until said other horizontal edge of said opening is firmly secured by said second retainer means.

12. An electronic chassis adapted for mounting within an opening having upper and lower horizontal edges and side edges in a cabinet wall of sheet material so that the chassis extends within the cabinet while one end thereof having a screen is visible within the opening, said chassis comprising:

a transverse top member, a bottom member and side members interconnecting said top and bottom members;

a flange means extending upwardly from said members and adapted to overlap the outside surface of said cabinet wall surrounding said opening when said chassis is placed through said opening;

bracket means fixed to a first said flange means;

drive screw means rotatable supported by said bracket means;

a movable retainer member threadedly engaged with said drive screw means and extending inwardly transverse to a first edge of said cabinet opening; and a second fixed retainer means spaced from a second said flange means that is opposite said first flange means, said fixed retainer means forming a seat for a second edge of said opening that is opposite said first edge;

whereby rotation of said drive screw means after placement of said chassis within said opening causes said movable retainer member to engage said first edge of said opening, and continued rotation of said screw means causes said chassis to move within said opening until said second edge of said opening is firmly secured by said fixed retainer means.

13. The electronic chassis described in claim 1 including a bezel frame unit attached to said chassis and adapted to fit around said cabinet opening, means for securing said bezel frame unit to said flange means of said chassis, and gasket means on a rear side of said bezel frame unit for preventing moisture from entering said cabinet around said chassis.

14. The electronic chassis described in claim 13 including access holes in one side of said bezel frame unit for providing access to said drive screw means, and penetrable cover means extending over said access holes for preventing moisture from passing through.

15. An electronic chassis adapted for mounting within an opening having upper and lower horizontal edges and side edges in a cabinet wall of sheet material so that the chassis extends within the cabinet while one end thereof having a screen is visible within the opening, said chassis comprising:

a transverse top member, a bottom member and side members interconnecting said top and bottom members;

first and second flange means extending from said members on opposite sides of said chassis and adapted to overlap the outside surface of said cabinet wall surrounding said opening when said chassis is placed through said opening;

a fixed bracket means spaced from said first flange means and forming a seat for retaining a first said edge of said opening;

a movable retainer means attached to said second flange means and extending inwardly transverse to a second edge of said cabinet opening which is on the opposite side from said first edge and drive means for adjusting, said movable retainer means, after placement of said chassis within said opening, for causing said movable retainer means to engage said second edge of said opening while moving said chassis toward said opposite edge of said opening and thereby hold it firmly within said seat of said fixed retainer means.

* * * * *